(12) United States Patent
Lundberg et al.

(10) Patent No.: US 6,434,559 B1
(45) Date of Patent: Aug. 13, 2002

(54) CRITICAL RESOURCE MANAGEMENT

(75) Inventors: James C. Lundberg, Blaine; Ronald Lynn Cleven, Burnsville, both of MN (US)

(73) Assignee: Xpandable Technology, Inc., New Brighton, MN (US)

( * ) Notice: Subject to any disclaimer, the term of this patent is extended or adjusted under 35 U.S.C. 154(b) by 0 days.

(21) Appl. No.: 09/169,380

(22) Filed: Oct. 9, 1998

(51) Int. Cl.[7] .............................................. G06F 17/30
(52) U.S. Cl. ..................... 707/7; 707/8; 707/9; 707/10; 707/205; 709/207; 370/450
(58) Field of Search ........................... 380/25; 370/450, 370/405; 455/38.2; 710/116; 709/207; 707/7, 9, 8, 10, 205

(56) References Cited

U.S. PATENT DOCUMENTS

| | | | | |
|---|---|---|---|---|
| 4,961,224 A | * | 10/1990 | Yung | 380/25 |
| 5,579,312 A | * | 11/1996 | Regache | 370/60.1 |
| 5,596,576 A | * | 1/1997 | Milito | 370/450 |
| 5,682,604 A | * | 10/1997 | Kashi et al | 455/38.2 |
| 5,689,656 A | * | 11/1997 | Baden et al. | 710/116 |
| 5,909,594 A | * | 6/1999 | Ross et al. | 710/20 |
| 6,055,533 A | * | 4/2000 | Hogge et al. | 707/7 |
| 6,055,564 A | * | 4/2000 | Phaal et al. | 709/207 |
| 6,073,132 A | * | 6/2000 | Gehman | 707/9 |
| 6,205,484 B1 | * | 3/2001 | Eriksson | 709/229 |

OTHER PUBLICATIONS

Steenhaut et al., "Performance Evaluation of the Extended Distributed Queueing Protocol for MAN", IEEE, 1995, pp. 829–837.*
Husein et al., "A Priority Based Service Algorithm for Use in Time–Critical and Integrated Services Networks", IEEE, 1997, pp. 93–97.*

* cited by examiner

Primary Examiner—Diane D. Mizrahi
Assistant Examiner—Thuy Pardo
(74) Attorney, Agent, or Firm—Schwegman, Lundberg, Woessner & Kluth, P.A.

(57) ABSTRACT

Critical resource management is disclosed. In one embodiment of the invention, a method is provided. First, the method detects whether maximum utilization of a critical resource has been reached. For example, the critical resource can be a number of modems within a modem pool of an Internet Server Provider (ISP). Second, the method determines the priority of access to this critical resource for each of a plurality of clients. For example, such clients can be end-user computers attempting to dial into the modem pool of the ISP. Third, the method denies access to at least one of the clients that have the lowest priority of access to the critical resource. For example, this can mean that a client currently connected to the ISP via a modem of the model pool is disconnected, or can mean that a client attempting to dial into the ISP is refused access.

32 Claims, 3 Drawing Sheets

CRITICAL RESOURCE MANAGEMENT

FIELD OF THE INVENTION

This invention relates generally to critical resources, such as but not limited to server connections and modem pools for servers, and more particularly to the management of such critical resources.

BACKGROUND OF THE INVENTION

Many Internet Service Providers (ISP's) offer Internet access by what is known as a dial-up line. For example, an ISP may have a given number of modems in a modem pool, such that when a user desires to connect to the Internet, he or she dials the phone number of the ISP, and the modem of the user's computer connects with one of the modems in the modem pool of the ISP. Many ISP's offer users the ability to connect for an unlimited or very large number of hours (for example, 150 hours) for a set fee per month.

However, the potential exists that the modem pool may become overloaded. For example, an ISP may have sufficient modems in the pool so that only one-third of its subscribers are able to connect at any given time. If more than one-third of the subscribers try to connect, such users may receive a busy signal when attempting to dial into the ISP. This can be frustrating for ISP subscribers, and potentially may result in a loss of business for the ISP, if those subscribers choose to go elsewhere for Internet access, or a need to add additional modems, resulting in increasing costs.

For these and other reasons, there is a need for the current invention.

SUMMARY OF THE INVENTION

The above-mentioned shortcomings, disadvantages and problems are addressed by the present invention, which will be understood by reading and studying the following specification. The invention in one embodiment includes a method. First, the method detects whether maximum utilization of a critical resource has been reached. In one specific embodiment, the critical resource can be a number of modems within a modem pool of an Internet Server Provider (ISP). Second, the method determines the priority of access to this critical resource for each of a plurality of clients. In one specific embodiment, such clients can be end-user computers attempting to dial into the modem pool of the ISP. Third, the method denies or terminates access to at least one of the clients that have the lowest priority of access to the critical resource. In one specific embodiment, this can mean that a client currently connected to the ISP via a modem of the modem pool is disconnected, or can mean that a client attempting to dial into the ISP is refused access.

Thus, the invention provides for advantages not found in the prior art. For example, an ISP can structure its service plans such that users who desire guaranteed access to the Internet have higher priority than other users, but pay for such access priority accordingly. The other users may in return pay a lower monthly fee for Internet access, with the understanding that during peak times there is a potential that they will not be able to access the Internet, or may be kicked off the Internet. Thus, the invention provides for better management of critical resources like modem pools than is found in the prior art.

The present invention includes systems, methods, servers and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is it shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
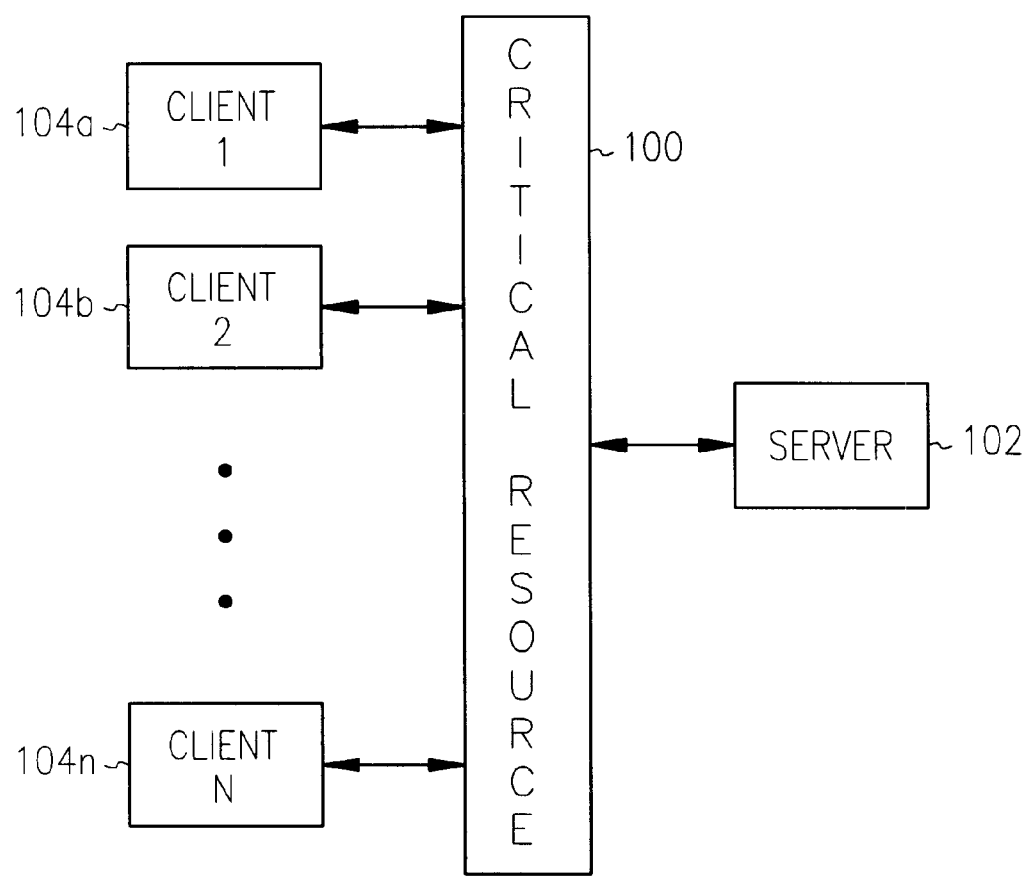
FIG. 1 is a block diagram of a system according to one embodiment of the invention.

Referring first to FIG. 1, a block diagram of a system according to one embodiment of the invention is shown. The system includes a critical resource 100, a server 102, and a number of clients 104a through 104n. The critical resource 100 provides a manner by which the clients 104a through 104n are able to connect to the server 102. For example, in one specific embodiment of the invention, the critical resource may include a number of modems within a modem pool of the server 102 so that a subset of the clients 104a through 104n are able to connect to the Internet through the server 102.

However, the invention is not particularly limited to a given critical resource 100. In different specific embodiments of the invention, the critical resource 100 can also be: a number of modems for connection to the server 102; a plurality of server connections for the server 102; a given amount of bandwidth to the server 102 (for example, in the case of Digital Subscriber Loop (DSL) connections, as known within the art); as well as other critical resources not listed herein.

Each of the clients 104a through 104n can be in one embodiment of the invention an end-user computer having a modem or other manner by which it is able to connect to the server 102 through the critical resource 100. Thus, such an end-user computer can in one embodiment connect to the Internet via the server 102.

Each client 104a through 104n has a priority number of predetermined units of access to the critical resource 100 for a given period of units. Such predetermined units in different embodiments can be: units of times (for example, minutes); and, units of information (for example, megabytes of information transferred or received); as well as other predetermined units not listed herein. Such given periods of units in different embodiments can be: a period of time as measured in predetermined units of time (for example, one month as measured in minutes); and, an amount of information as measured in predetermined units of information (for example, one gigabyte of information as measured in kilobytes of information); as well as other given periods not listed herein.

The priority number of predetermined units of access for a given client can in one embodiment be determined by a given access plan paid for by the client: a user desiring more guaranteed Internet access, for example, may have 150 priority hours for $20 a month. Another user desiring cheaper but less guaranteed Internet access may have only 5 priority hours but for $5 a month.

Each client 104a through 104n also has an actual number of predetermined units of access to the critical resource 100 for the given period of units. As opposed to the priority number of predetermined units of access for a given client to the critical resource 100, which in one embodiment can be determined by the user paying a higher fee for a larger priority number, the actual number of predetermined units of access to the critical resource 100 is the actual number of predetermined units that the given client has accessed the critical resource 100 for the given period.

For example, in one specific embodiment the given period of units can be one month as measured back from the current date and the predetermined units can be minutes, such that the actual number of predetermined units of access to the critical resource by a given client for the given period of units is the actual number of minutes that the given client accessed the critical resource in the previous month, as measured back from the current date.

The server 102 is in one embodiment of the invention a computer as is described later in the detailed description. The server 102 manages access by the clients 104a through 104n to the critical resource 100. Upon maximum utilization of the critical resource 100, the server denies access to at least one of the clients 104a through 104n that have the lowest priorities of access to the critical resource 100.

In one embodiment, although the invention itself is not so limited, maximum utilization of the critical resource 100 can be defined as each of the modems within a modem pool being used by (that is, connected to) a different of clients 104a through 104n. In such instance, the server 102 then denies access to one of the clients 104a through 104n connected to the critical resource 100. For example, the server can in one embodiment disconnect one of the clients 104a through 104n that has the lowest priority of access. This enables the server 102 to keep at least one modem within the modem pool open for other clients 104a through 104n to connect to the critical resource 100.

The server 102 determines the priority of access of each of the clients 104a through 104n to the critical resource 100, to measure which of the clients have the lowest priority of access, by subtracting the actual number of predetermined units for the given period of units for each client from the priority number of predetermined units for the given period of units for that client. In one embodiment, where the resulting number is greater than or equal to zero, it is set to zero. The resulting number for each client thus is the priority of that client, where a lower number indicates a lower priority. The client or clients with the lowest priority can then be denied access to the critical resource 100 by the server 102.

As an example intended only to illustrate an embodiment of the invention and not intended to limit the invention as a whole, the critical resource 100 may include two modems within a modem pool, and the clients 104a through 104n may include three clients: a first client having four hours of priority access and having actually accessed the critical resource five hours in the previous month; a second client having one-hundred fifty hours of priority access and having actually accessed the critical resource twenty hours in the previous month; and, a third client having one-hundred fifty hours of priority access and having actually accessed the critical resource two-hundred hours in the previous month. These clients thus have a priority of: 4−5=−1; 150−20=130 (set to 0); and, 150−200=−50, respectively. Therefore, if the first and the second clients were connected, the first client may be denied access because it has lower priority of access; if the first and the third clients were connected, the third client may be similarly denied access; if the second and the third clients were connected, the third client may similarly be denied access.

Figure 2:
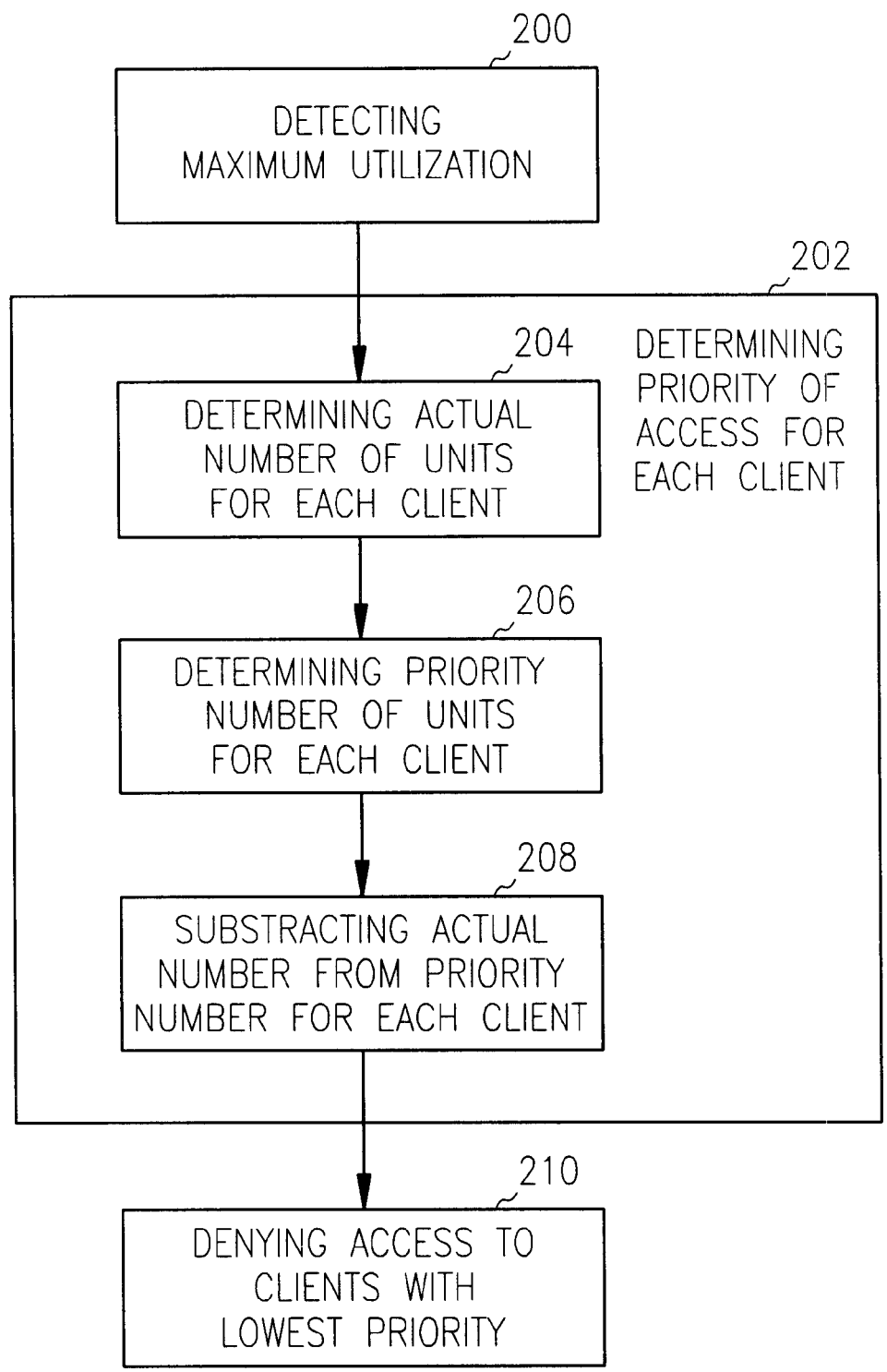
FIG. 2 is a flowchart of a method according to one embodiment of the invention; and, FIG. 3 is a diagram of a computer in conjunction with which embodiments of the invention may be practiced.

Referring next to FIG. 2, a flowchart of a method according to one embodiment of the invention is shown. The method is desirably realized at least in part as one or more programs running on a (server) computer—that is, as a program executed from a computer-readable medium such as a memory by a processor. Such programs are desirably made up of computer instructions for execution on the computer. The programs are also desirably storable on a computer-readable medium such as a floppy disk or a CD-ROM, for distribution and installation and execution on another (suitably equipped) computer. Thus, in one embodiment, a program is executed by a processor of a (server) computer from a medium thereof to deny access to at least one of a plurality of clients having lowest priorities of access to a critical resource upon maximum utilization of the critical resource.

In 200, the method determines maximum utilization of a critical resource. If maximum utilization of the critical resource has been reached, then the method proceeds with 202 and 210. In 202, the method determines a priority of access to the critical resource of each of a number of clients, such as in one embodiment the number of clients currently accessing (that is, connected to) the critical resource. The method determines this priority for each of the clients to determine the clients with the lowest priorities.

In one embodiment of the invention, the access priority of each client is determined via 204, 206 and 208. In 204, the actual number of predetermined units of access for a given period of units is determined for each client. In 206, the priority number of predetermined units of access for the given period of units is determined for each client. Finally, in 208, the actual number of predetermined units for the given period of units for each client is subtracted from the priority number of predetermined units for the given period of units for that client. The resulting number can in one embodiment be set to zero if it is greater than or equal to zero. The resulting number for each client thus represents the priority of access for that client, where a lower (negative) number indicates a lower access priority. Clients having the same resulting number have equal access.

Thus, in 210, the method denies access to at least one of the clients having the lowest priorities of access to the critical resource. In one embodiment, this is accomplished by disconnecting a currently connected client having the lowest access priority from the critical resource. That is, the method disconnects current access to the at least one of the clients having the lowest priority of access from the critical resource. In another embodiment of the invention, denying access is accomplished by refusing asked-for access by the at least one of the clients having the lowest priority of access to the critical resource. For example, when such a client or clients attempts to connect to the critical resource, such attempted access is refused to the client or clients.

Figure 3:
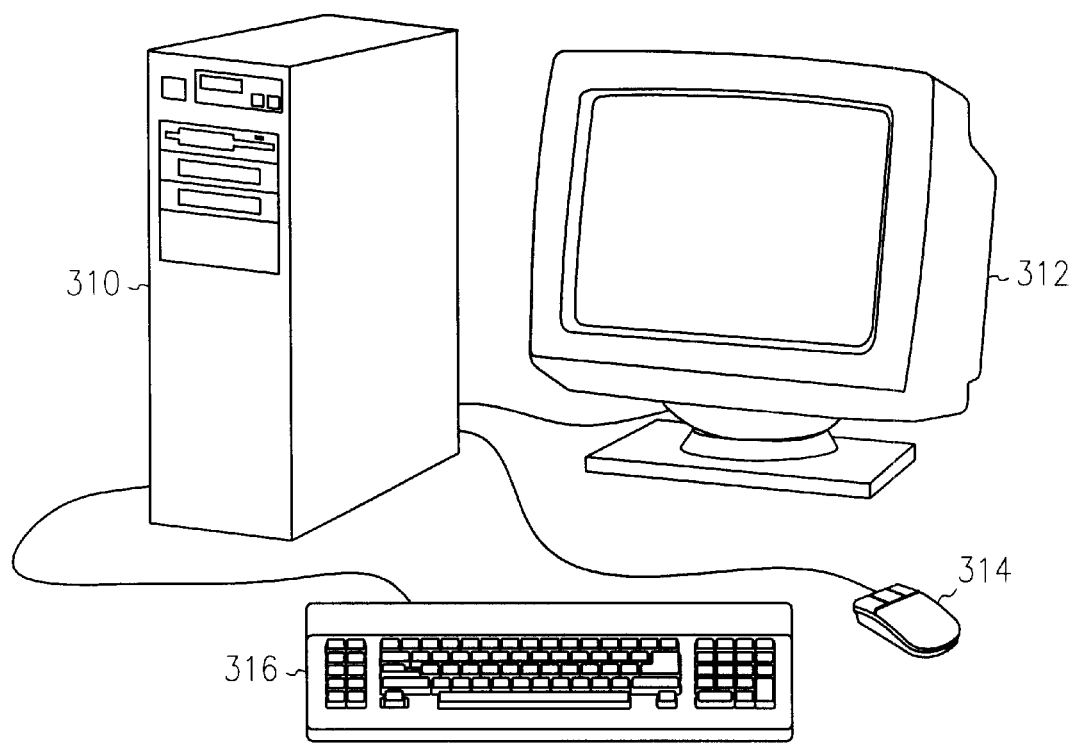

Referring finally to FIG. 3, a diagram of a computer in conjunction with which embodiments of the invention may be practiced is shown. Computer 310 is operatively coupled to monitor 312, pointing device 314, and keyboard 316. Computer 310 includes a processor (desirably, an INTEL PENTIUM processor), random-access memory (PAM) (desirably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310. Computer 310 desirably is a PC-compatible computer, running a version of the Microsoft Windows operating system.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interface of operating systems such as versions of Microsoft Windows. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Critical resource management has been described. Although specific embodiments of the invention have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:
    a critical resource;
    a plurality of clients, each having a priority number of predetermined units of access to the critical resource for a given period of units and an actual number of predetermined units of access to the critical resource for the given period of units;
    a server to manage access by the plurality of clients to the critical resource such that upon maximum utilization of the critical resource the server denies access to at least one of the clients having lowest priorities of access, as measured by subtracting the actual number of predetermined units for the given period of units for each client from the priority number of predetermined units for the given period of units for the client.

2. The system of claim 1, wherein the critical resource is selected from the group essentially consisting of: a plurality of modems for connection to the server, a plurality of server connections, and a given amount of bandwidth to the server.

3. The system of claim 1, wherein the predetermined units is selected from the group essentially consisting of: units of time, and units of information.

4. The system of claim 1, wherein the given period of units is selected from the group essentially consisting of: a period of time as measured in predetermined units of time, an amount of information as measured in predetermined units of information.

5. The system of claim 1, wherein the critical resource comprises a plurality of modems for connection of the plurality of clients to the Internet through the server, the predetermined units comprises minutes, and the given period of units comprises a month as measured back from the current date.

6. A method comprising:
    detecting an amount of utilization of a critical resource;
    determining a priority of access to the critical resource of each of a plurality of clients concurrently accessing the critical resource, based on a difference in a measured number of predetermined units of access for a given period of units for each client and a priority number of predetermined units of access for the given period of units for the client; and,
    terminating the access of at least one of the clients having the lowest priority of access to the critical resource, thereby assuring that the critical resource is never completely unavailable for use.

7. The method of claim 6, wherein the critical resource is selected from the group consisting of: a plurality of modems for connection to the server, a plurality of server connections, and a given amount of bandwidth to a server.

8. The method of claim 6, wherein determining the priority of access to the critical resource of each of the plurality of clients comprises:
    determining an actual number of predetermined units of access for a given period of units for each client;
    determining a priority number of predetermined units of access for the given period of units for each client; and,
    subtracting the actual number of predetermined units for the given period of units for each client from the priority number of predetermined units for the given period of units for the client.

9. The method of claim 8, wherein the predetermined units is selected from the group consisting essentially of: units of time, and units of information.

10. The method of claim 8, wherein the given period of units is selected from the group essentially consisting of: a period of time as measured in predetermined units of time, an amount of information as measured in predetermined units of information.

11. The method of claim 8, wherein the critical resource comprises a plurality of modems for connection of the plurality of clients to the server over the Internet, the predetermined units comprises minutes, and the given period of units comprises a month as measured back from the current date.

12. The method of claim 6, wherein denying access to the at least one of the clients having the lowest priority of access to the critical resource comprises disconnecting current access to the at least one of the clients having the lowest priority of access from the critical resource.

13. The method of claim 6, wherein denying access to the at least one of the clients having the lowest priority of access to the critical resource comprises refusing asked-for access by the at least one of the clients having the lowest priority of access to the critical resource.

14. A computer:
    a processor;
    a computer-readable medium; and,
    a program executed by the processor from the medium to deny access to at least one of a plurality of clients having lowest priorities of access to a critical resource upon maximum utilization of the critical resource, with each priority of access based on a difference in measured number of predetermined units of access for a given period of units for each client and a priority number of predetermined units of access for the given period of units for the client.

15. The computer of claim 14, wherein the computer-readable medium comprises a memory.

16. The computer of claim 14, wherein the program comprises computer instructions to perform a method comprising:
   determining an actual number of predetermined units of access for a given period of units for each client;
   determining a priority number of predetermined units of access for the given period of units for each client; and,
   subtracting the actual number of predetermined units for the given period of units for each client from the priority number of predetermined units for the given period of units for the client.

17. The computer of claim 16, wherein the critical resource comprises a plurality of modems for connection of the plurality of clients to the server over the Internet, the predetermined units comprises minutes, and the given period of units comprises a month as measured back from the current date.

18. A computer-readable medium having a computer program stored thereon for terminating access of at least one client of a plurality of clients concurrently accessing a critical resource, in response to detecting a level of usage of the critical resource, with the one client selected based on a priority of access, with the priority of access based on a difference on a measured number of predetermined units of access for a given period of units for each client and a priority number of predetermined units of access for the given period of units for the client.

19. The computer-readable medium of claim 18, wherein the medium is selected from the group consisting of: a floppy disk, and a compact-disc read-only-memory (CD-ROM).

20. The computer-readable medium of claim 18, wherein the program comprises computer instructions to perform a method comprising:
   determining an actual number of predetermined units of access for a given period of units for each client;
   determining a priority number of predetermined units of access for the given period of units for each client; and,
   subtracting the actual number of predetermined units for the given period of units for each client from the priority number of predetermined units for the given period of units for the client.

21. The computer-readable medium of claim 20, wherein the critical resource comprises a plurality of modems for connection of the plurality of clients to the server over the Internet, the predetermined units comprises minutes, and the given period of units comprises a month as measured back from the current date.

22. A method of handling requests for Internet connections through a server, the method comprising:
   establishing one or more first Internet connections for a plurality of clients, with each client having a respective priority number of predetermined units of Internet access through the server;
   receiving a request from a second client to establish a second Internet connection;
   establishing the second Internet connection for the second client;
   determining that the server is providing or has exceeded a specific level of utilization; and
   terminating or degrading one or more of the first Internet connections, with each of the terminated or degraded first Internet connections selected based on difference in a measured number of units of access for a given period of units for the client and the respective priority number of predetermined units of Internet access for the client.

23. The method of claim 22, wherein determining that the server is providing or has exceeded a specific level of utilization occurs before establishing the second Internet connection.

24. A machine-readable medium comprising instructions for execution of the method of claim 22.

25. A method of providing Internet service to a plurality of client computers, the method comprising:
   providing a number of Internet-connection resources for use by the plurality of client computers during a period of operation; and
   maintaining at least one of the Internet-connection resources available at all times during the period of operation to establish a new Internet connection in response to a request from one of the plurality of client computers wherein maintaining the one Internet-connection resource available comprises:
   determining a priority of access to the Internet-connection resources of each of the client computers using one of the unavailable Internet-connection resources, based on a difference in a number of units of access for a given period of units for a client associated with the client computer and a respective priority number of predetermined units of Internet access for the client.

26. The method of claim 25 wherein maintaining at least one of the Internet connections available for use comprises:
   receiving a request from one of the client computers to establish a new Internet connection using one of the Internet-connection resources when a number of the Internet-connection resources are available for use in establishing the new connection and a number of Internet-connection resources are unavailable for use in establishing the new Internet connection;
   answering the request to establish the new Internet connection using one of the available Internet-connection resources;
   determining that the number of available Internet-connection resources is inconsistent with a desired number of available Internet-connection resources, with the desired number being at least one; and
   terminating at least one Internet connection associated with one of the number of unavailable Internet-connection resources in response to the determination regarding the number of available Internet-connection resources.

27. The method of claim 26, wherein the number of Internet-connection resources comprises a plurality of modems, a plurality of server connections, or a plurality of bandwidth portions.

28. A machine-readable medium comprising instructions for execution of the method of claim 27.

29. The method of claim 26, wherein terminating at least one Internet connection associated with one of the number of unavailable Internet-connection resources comprises:
   determining a priority of access to the Internet-connection resources of each of the client computers using one of the unavailable Internet-connection resources; and terminating the Internet-connection for at least one of the clients having the lowest priority of access.

30. A machine-readable medium comprising instructions for execution of the method of claim 29.

31. The method of claim 29, wherein determining the priority of access to the Internet-connection resources comprises:

determining an actual number of predetermined units of access for a given period of units for each of the client computers;

determining a priority number of predetermined units of access for the given period of units for each of the client computers; and subtracting the actual number of predetermined units for the given period of units for each client computer from the priority number of predetermined units for the given period of units for the client computer.

32. A machine-readable medium comprising instructions for execution of the method of claim 31.

\* \* \* \* \*

UNITED STATES PATENT AND TRADEMARK OFFICE
CERTIFICATE OF CORRECTION

PATENT NO. : 6,434,559 B1
DATED : August 13, 2002
INVENTOR(S) : James C. Lundberg and Ronald Lynn Cleven It is certified that error appears in the above-identified patent and that said Letters Patent is hereby corrected as shown below:

<u>Title page,</u>
Item [56], U.S. PATENT DOCUMENTS, "5,682,604" reference insert
-- . -- after "et al".

<u>Column 7,</u>
Line 3, insert -- a -- after "in".
Line 32, delete "on" and insert -- in --, therefor.

<u>Column 8,</u>
Line 5, insert -- a -- after "on".

Signed and Sealed this

Fourth Day of February, 2003

JAMES E. ROGAN
*Director of the United States Patent and Trademark Office*